US012560250B2

(12) United States Patent
Fangmeier

(10) Patent No.: US 12,560,250 B2
(45) Date of Patent: Feb. 24, 2026

(54) CHECK VALVE WITH INTEGRATED PRESSURE RELIEF VALVE

(71) Applicant: Neoperl GmbH, Müllheim (DE)

(72) Inventor: Martin Fangmeier, Auggen (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 18/023,147

(22) PCT Filed: Aug. 10, 2021

(86) PCT No.: PCT/EP2021/072297
§ 371 (c)(1),
(2) Date: Feb. 24, 2023

(87) PCT Pub. No.: WO2022/048867
PCT Pub. Date: Mar. 10, 2022

(65) Prior Publication Data
US 2023/0235826 A1     Jul. 27, 2023

(30) Foreign Application Priority Data

Sep. 1, 2020     (DE) .......................... 202020105036.2

(51) Int. Cl.
*F16K 15/06*     (2006.01)
*F16K 17/04*     (2006.01)
*F16K 25/00*     (2006.01)

(52) U.S. Cl.
CPC ............ *F16K 15/063* (2013.01); *F16K 17/04* (2013.01); *F16K 25/005* (2013.01)

(58) Field of Classification Search
CPC .... F16K 17/196; F16K 15/063; F16K 25/005; F16K 17/04; F16K 17/18
See application file for complete search history.

(56) References Cited

U.S. PATENT DOCUMENTS 2,191,636 A     2/1940 Walker
2,518,387 A *   8/1950 Shaw .................... F16K 15/063
                                                          267/136

(Continued)

FOREIGN PATENT DOCUMENTS

DE          2455792        8/1976
DE          29814764       11/1998

(Continued)

OTHER PUBLICATIONS

WO2020085211 with translation retrieved 2024 (Year: 2024).*

(Continued)

*Primary Examiner* — Jessica Cahill
(74) *Attorney, Agent, or Firm* — Volpe Koenig

(57)     ABSTRACT

A check valve having a valve that is movable by incoming water in the flow direction, from a closed position, where it bears against a first valve seat, against a restoring force into an open position, where it is raised from the first valve seat, and having a pressure relief valve with a closing member that is movable by pressure of the water flowing back against the flow direction, from a closed position, in which it bears against a second valve seat, against a restoring force into an open position where it is raised from the second valve seat. The restoring force acting on the closing member is greater than the restoring force acting on the valve body. The closing member has a closing member core made of a first material, and at least in the partial region thereof that abuts the second valve seat in the closed position, has a film or a layer made of a second relatively softer and/or elastic material.

16 Claims, 4 Drawing Sheets

(56) References Cited

U.S. PATENT DOCUMENTS

| | | | | |
|---|---|---|---|---|
| 2,598,131 | A | 5/1952 | O'Donnell | |
| 2,995,148 | A * | 8/1961 | Novak | F16K 17/196 |
| | | | | 137/493.5 |
| 3,153,423 | A * | 10/1964 | Biello | F16K 17/196 |
| | | | | 137/493.5 |
| 3,724,707 | A | 4/1973 | Burgess | |
| 3,939,866 | A * | 2/1976 | Pignatelli | B60K 15/04 |
| | | | | 220/203.26 |
| 4,693,269 | A * | 9/1987 | Yamada | F16K 15/063 |
| | | | | 137/514.7 |
| 5,183,075 | A * | 2/1993 | Stein | F16K 17/196 |
| | | | | 137/512.5 |
| 6,517,076 | B1 * | 2/2003 | Menage | F16J 15/102 |
| | | | | 277/606 |
| 2004/0045607 | A1 * | 3/2004 | Lammers | F16K 15/063 |
| | | | | 137/543 |
| 2005/0028869 | A1 * | 2/2005 | Roth | F16K 17/196 |
| | | | | 137/493.4 |
| 2011/0278775 | A1 * | 11/2011 | Germano | F16K 17/196 |
| | | | | 267/64.23 |
| 2012/0037243 | A1 * | 2/2012 | Taylor | F16K 27/02 |
| | | | | 137/209 |
| 2014/0261809 | A1 * | 9/2014 | Rife | A61M 39/223 |
| | | | | 137/625.4 |
| 2016/0298889 | A1 * | 10/2016 | Dam | F25B 41/33 |
| 2018/0163610 | A1 * | 6/2018 | Cha | F16K 24/00 |
| 2018/0259077 | A1 * | 9/2018 | Shinoyama | F16K 17/196 |
| 2021/0270359 | A1 * | 9/2021 | Cao | F16H 57/027 |

FOREIGN PATENT DOCUMENTS

| | | | |
|---|---|---|---|
| DE | 20312495 | 1/2004 | |
| DE | 102009056496 | 8/2011 | |
| DE | 102015002161 | 8/2016 | |
| DE | 20203515 | 7/2022 | |
| EP | 0653033 | 9/1996 | |
| EP | 2821736 | 1/2015 | |
| WO | WO-9725559 A1 * | 7/1997 | F16K 17/0466 |
| WO | WO-2010061572 A1 * | 6/2010 | F16K 17/02 |
| WO | 2017015009 | 1/2017 | |
| WO | WO-2020085211 A1 * | 4/2020 | |

OTHER PUBLICATIONS

WO2010061572 with translation retrieved 2024 (Year: 2024).*

Wikipedia, Spritzgiessen, 12 pages, retrieved from https://de.wikipedia.org/w/index.php?title=Mehrkomponenten-Spritzgieflen&oldid=196863470, Feb. 16, 2020.

(cf. https://de.www.additively.com/de/showcase/de/optimiertes-kugelrueckschlagventil-fuer-fluessigkeitsfuellsystem-hp), retrieved Feb. 24, 2023.

* cited by examiner

CHECK VALVE WITH INTEGRATED PRESSURE RELIEF VALVE

CROSS-REFERENCE TO RELATED APPLICATIONS

This application is a 371 National Phase of International Application No. PCT/EP2021/072297, filed Aug. 10, 2021, which claims priority to German Patent Application No. 20 2020 105 036.2, filed Sep. 1, 2020, both of which are incorporated herein in their entirety as if fully set forth.

TECHNICAL FIELD

The invention relates to a check valve having a valve body which by the incoming water in the flow direction is movable counter to a restoring force, from a closed position in which closed position the valve body bears tightly on a first valve seat, to an open position in which the valve body is raised from the first valve seat, and having a pressure relief valve which has a closing member which by the pressure of the water returning counter to the flow direction is movable counter to a restoring force, from a closed position in which the closing member bears tightly on a second valve seat, to an open position in which open position the closing member is raised from the second valve seat, wherein the restoring force acting on the closing member of the pressure relief valve is greater in comparison to the restoring force acting on the valve body.

BACKGROUND

In sanitary fittings, in particular those that have a temperature thermostat and a flow regulator and shut-off valve disposed separately therefrom, backflow preventers which in the event of a closed water retrieval are intended to prevent an overflow between the cold water and warm water connections are typically used in supply lines of the cold water and warm water supplies. The problem arises herein that, in the event of closed backflow preventers and a simultaneously closed water retrieval, a water volume which is closed off by backflow preventers and the closed flow regulator valve results within the fitting, substantial pressures due to the non-compressibility of the water arising by virtue of said water volume during heating and expansion, for example when the cold water supply is briefly opened in the event of an already warm fitting.

In order for problems of this type to be avoided, a specific check valve has been achieved for sanitary water fittings, said check valve having a valve body which by the incoming water in the usual flow direction, counter to a restoring force, is movable from a closed position, in which closed position the valve body bears tightly on a valve seat, to an open position in which the valve body is raised from the valve seat (cf. EP 0 653 033 B1). A pressure relief valve is integrated in the valve body of the known check valve. To this end, the valve body of the check valve consists of a cone which has a tubular appendage having a lateral entry opening, and a cone cap which possesses a hood-shaped attachment having a lateral exit opening. Between the head of the hood-shaped attachment and the upper end of the tubular appendage, the latter serving as the valve seat of the pressure relief valve, the closing member of the pressure relief valve is pretensioned in the valve seat. The closing member of the pressure relief valve here is configured as an elastic molded part. If the known check valve is then installed in the cold water supply line of a single-lever mixer unit, for example, in which the cold-water side is blocked but the warm-water side is opened, and if the cold water check valve is closed, heating the water may cause a high pressure between the closed cold water valve of the fitting and the closed cold water check valve, said high pressure by way of the opening in the tubular appendage acting on the integrated pressure relief valve such that the closing member is raised from the valve seat of the pressure relief valve, the water being able to escape via the lateral exit opening of the hood-shaped attachment.

Also, a check valve of the type mentioned at the outset in which the pressure relief valve has a closing member that is guided so as to be displaceable in the valve body of the check valve and in the event of excessive positive pressure on the outflow side of the check valve is movable counter to the usual flow direction and counter to the force of a strong restoring spring, from a closed position to an open position and enables a pressure relief in the supply line has already been achieved. The closing member of the pressure relief valve integrated in the known check valve here is formed from a metallic sphere which by the restoring spring is pushed against the valve seat of the pressure relief valve, which is produced from a thermoplastic plastics material (cf. https://de.www.additively.com/de/showcase/de/optimiertes-kugelrueckschlagventil-fuer-fluessigkeitsfuellsystem-np). Since the injection-molding tools used for producing the known check valve are subject to wear in the manufacturing process, the tightness of the known check valve in the region of the pressure relief valve thereof can increasingly decrease, or else the functional reliability of the pressure relief valve may be compromised.

SUMMARY

Therefore, there is the object of achieving a check valve of the type mentioned at the outset which is insensitive to manufacturing-related tolerances of the components thereof, and over the entire service life is at all times distinguished by a high level of tightness and functional reliability in terms of the tolerance range of the opening pressure.

The achievement according to the invention of this object in the check valve of the type mentioned at the outset lies in particular in that the closing member of the pressure relief valve has a closing member core from a first material, said closing member core in the sub-region thereof that in the closed position bears tightly on the second valve seat carrying a film or a layer from a second, comparatively softer and/or more elastic material.

The check valve according to the invention has a valve body which by the incoming water in the flow direction is movable from a closed position, in which closed position the valve body bears tightly on a first valve seat, toward an open position in which the valve body is raised from the first valve seat. Since the valve body is moved from the closed position thereof to an open position by the incoming water in the usual direction, the incoming water in the usual flow direction can pass the check valve.

In contrast, since a backflow flowing counter to the usual flow direction presses the valve body against the first valve seat, such backflows are effectively prevented. If the pressure prevalent on the outflow side of the check valve exceeds an established maximum value, and there is as a result the threat of a pressure-related destruction of the components located in the fitting, for example, a pressure relief valve which is integrated in the check valve according to the invention swings into action. This pressure relief valve has a closing member which by the pressure of the water returning counter to the flow direction is movable counter to a restoring force, from a closed position in which the closing member bears tightly on a second valve seat, to an open position in which open position the closing member of the pressure relief valve is raised from the second valve seat. The restoring force acting on the closing member of the pressure relief valve here is greater in comparison to the restoring force acting on the valve body, such that the check valve counteracts the backflows flowing counter to the usual flow direction, while the pressure relief valve ultimately slightly opens in the event of an excessive pressure of these backflows and sufficiently dissipates the positive pressure prevalent on the outflow side of the valve body of the check valve.

It can be expedient here for the film or layer carried by the closing member core to be produced from an elastomer, preferably from rubber, silicone or a thermoplastic elastomer.

The simple production of the check valve according to the invention is substantially facilitated when the closing member of the pressure relief valve is designed as a bi-component or multi-component injection-molded plastic part.

In order for the valve body of the check valve, or the closing member of the pressure relief valve, in the respective closed position thereof to be securely pressed against the first or the second valve seat, respectively, it is advantageous for the restoring force acting on the valve body and/or the restoring force acting on the closing member to be applied by at least one rubber-elastic or spring-elastic restoring element.

A particularly simple and nevertheless functionally reliable embodiment according to the invention provides that the at least one restoring element is configured as a compression spring.

In order for the assembly of the check valve according to the invention to be facilitated and for a functionally compromising assembly of the check valve according to the invention to be prevented, it is advantageous for the check valve to have a valve housing, and for the pressure relief valve to be integrated in the check valve.

A particularly compact and space-saving embodiment according to the invention provides that the pressure relief valve is integrated in the valve body of the check valve.

A refinement according to the invention provides that the valve body of the check valve is penetrated by an in particular centrally disposed pressure relief duct, in which pressure relief duct the closing member of the pressure relief valve is disposed so as to be movable between the closed position and the open position of the pressure relief valve.

In order for the functional reliability of the pressure relief valve integrated in the check valve according to the invention to be enhanced, it is advantageous for the second valve seat to be formed by an annular face which preferably widens conically counter to the flow direction.

In order for the closing member of the pressure relief valve in the closed position to now bear on the annular face of the second valve seat only in a linearly encircling sub-region, it is advantageous for the closing member, at least in the circumferential sub-region thereof that in the closed position bears on the valve seat and/or carries the film or layer, to be shaped in the form of a ball segment or spherical segment. In order for the closing member of the pressure relief valve to be reliably guided during the sliding movements in the pressure relief duct, it is advantageous for the closing member on the inflow side thereof and/or on the outflow side thereof to carry a stopper, wherein the inflow side of the closing member is the end side that has an incident flow in the flow direction of the pressure relief valve, and the outflow side is the end side of the closing member facing away therefrom.

The assembly of the check valve according to the invention, also in the region of the pressure relief valve thereof, is facilitated when the stopper that on the closing member is disposed on the inflow side and is oriented in the flow direction has a cylindrical stopper shape.

In order to counteract canting, even of a closing member of elongate configuration, in the pressure relief duct, it is advantageous for the stopper that on the closing member is disposed on the outflow side and is oriented counter to the flow direction to taper toward the free stopper end thereof and to preferably be configured so as to be frustoconical.

Jamming of the closing member on the second valve seat is counteracted when the closing member core has a diameter which is larger in comparison to the smallest diameter of the valve seat.

Preferred embodiments according to the invention provide that the closing member core is produced from a thermoplastic plastics material, in particular from a POM plastics material or a PBT (polybutylene terephthalate) plastics material. Such a closing member core produced from a hard thermoplastic material is sufficiently stable.

It is advantageous for the elastic film or layer to be composed of silicone.

The film or layer here can have a layer thickness of 0.10 to 0.50 mm, preferably of 0.15 to 0.32 mm, and in particular of 0.15 to 0.22 mm.

It is advantageous for the film or layer to have a Shore hardness of 30 to 100 Sh-A, preferably of 70 to 90 Sh-A.

A refining embodiment according to the invention provides that the check valve in the region of the valve seat thereof is produced from a hard material and/or a hard or hard-elastic thermoplastic plastics material.

BRIEF DESCRIPTION OF THE DRAWINGS

Refinements according to the invention are derived from the claims in conjunction with the drawing and the description. The invention will be described in yet more detail hereunder by means of a preferred exemplary embodiment.

In the drawings.

DETAILED DESCRIPTION

Figure 1:
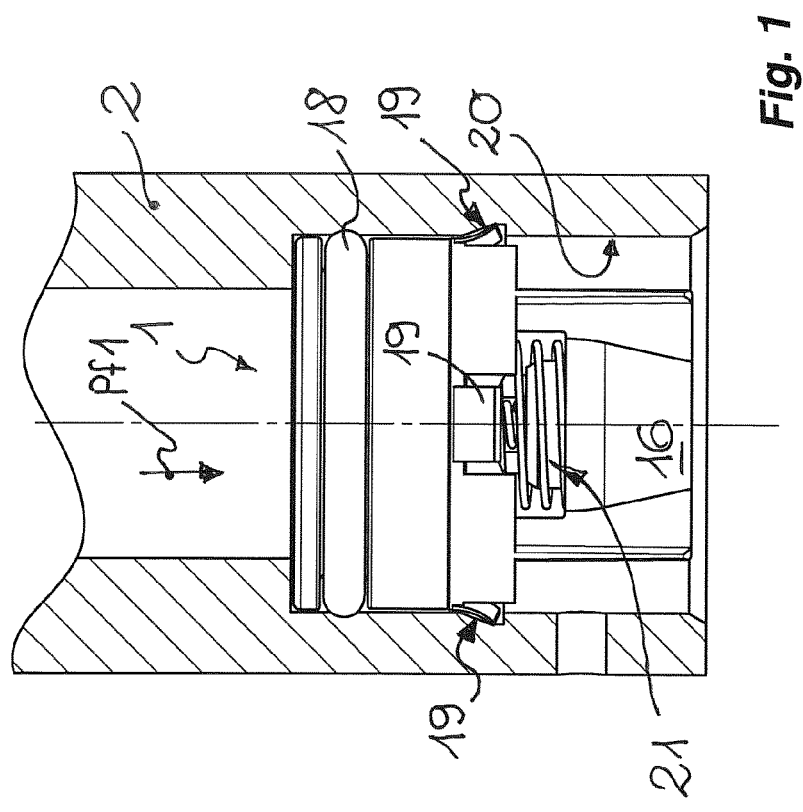
FIG. 1 shows a check valve which is inserted in a sanitary water line and in which a pressure relief valve is integrated.
Figures 2, 3, 4, 5, 6:
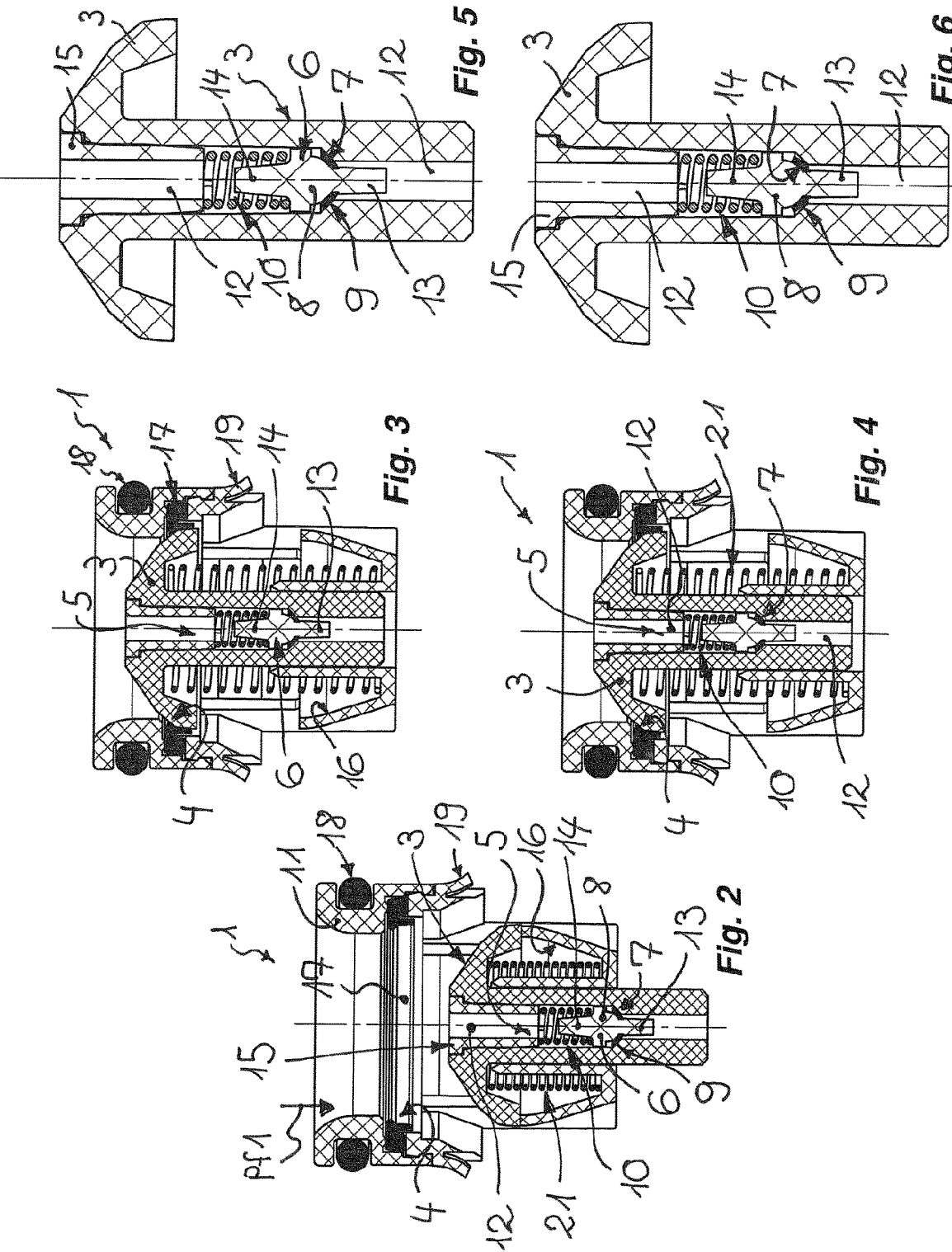
FIG. 2 shows the check valve from FIG. 1 in a longitudinal section, wherein the valve body of the check valve is penetrated by a pressure relief duct, in which pressure relief duct the closing member of a pressure relief valve is movable counter to a restoring force, from a closed position to an open position, and wherein the valve body of the check valve is situated in the open position thereof.
FIG. 3 shows the check valve from FIGS. 1 and 2, having the valve body thereof that bears on a first valve seat, wherein the pressure relief valve integrated in the valve body here too is situated in the closed position thereof.
FIG. 4 shows the valve body, illustrated in isolation in a longitudinal section, of the check valve shown in FIGS. 1 to 3, having the pressure relief valve integrated therein, said pressure relief valve here being situated in the closed position thereof.
FIG. 5 shows the check valve from FIGS. 1 to 3, which is likewise illustrated in a longitudinal section here, in the closed position of the valve body thereof, wherein the pressure relief valve integrated in the valve body here is situated in the open position thereof.
FIG. 6 shows the valve body of the check valve shown in FIGS. 1 to 3 and 5, having the pressure relief valve situated in the open position thereof.

Shown in FIGS. 1 to 3, 5, 7 and 9 is a check valve 1 which can be inserted for example into the supply line 2 of a cold water or hot water supply so as to in the inflow direction be in front of a single-lever mixer valve. The check valve 1 has a valve body 3 which by the incoming water in the flow direction is movable counter to a restoring force, from the closed position shown in FIGS. 3, 5, 7 and 9, in which closed position the valve body 3 bears tightly on a first valve seat 4, to the open position shown in FIG. 2, in which the valve body 3 is raised from the first valve seat 4. Since the valve body 3 by the incoming water in the usual flow direction Pf1 is moved from the closed position of the former to the open position, the incoming water in the usual flow direction Pf1 can pass the check valve 1.

In contrast, a backflow flowing counter to the usual flow direction Pf1 presses the valve body 3 against the first valve seat 4 so that such backflows cannot flow through the valve seat 4 counter to the flow direction Pf1.

If the pressure prevalent on the outflow side of the check valve exceeds an established maximum value, and there is as a result the threat of a pressure-related destruction of the components located in a fitting disposed on the outflow side, for example, a pressure relief valve 5 which is integrated in the check valve 1 swings into action. This pressure relief valve 5 has a closing member 6 which, by the pressure of the water returning counter to the flow direction Pf1, is movable counter to a restoring force in the direction of the arrow Pf2 of the pressure relief valve 5, from a closed position in which the closing member 6 bears tightly on a second valve seat 7, to an open position in which open position the closing member 6 is raised from the second valve seat 7. The restoring force acting on the closing member 6 of the pressure relief valve 5 here is greater in comparison to the restoring force acting on the valve body 3.

It can be readily seen in FIGS. 4 and 6 to 10 that the closing member 6 of the pressure relief valve 5 has a closing member core 8 from a first material, said closing member core 8 in the sub-region thereof that in the closed position bears tightly on the second valve seat 7 carrying a film or a layer 9 from a second, comparatively softer and/or more elastic material. Since the layer 9 or film that surrounds the closing member core 8 at least in the sub-region thereof that bears on the valve seat 7 of the pressure relief valve 5 is composed of a softer and/or more elastic material compared to the closing member core 8, the closing member 6 of the pressure relief valve 5 in the closed position of the former can readily bear on the second valve seat 7, wherein manufacturing tolerances are also well equalized. Since the closing member 6 of the pressure relief valve 5 has a closing member core 8 from a comparatively harder material and is not composed of the same soft and/or elastic material as the film or layer 9, it is avoided that the closing member 6 is excessively depressed into the valve seat 7, and malfunctions of the pressure relief valve 5 caused by the former are avoided. Therefore, the check valve 1 illustrated here to this extent is also distinguished by a high level of functional reliability, even at high opening pressures of the pressure relief valve 5.

The closing member 6 of the pressure relief valve 5 here can also be designed as a bi-component or multi-component injection-molded plastic part.

As becomes obvious when viewing FIGS. 1 to 10 in combination, the restoring force acting on the valve body 3 as well as the restoring force acting on the closing member 6 are in each case applied by at least one rubber-elastic restoring element, or—as here—a spring-elastic restoring element. The restoring elements assigned to the valve body 3, or to the closing member 6, respectively, are configured here as compression springs 10, 21.

It can be seen in FIGS. 1 to 3, 5, 7 and 9 that the check valve 1 has a valve housing 11, and that the pressure relief valve 5 is integrated in the check valve 1. It becomes obvious when viewing FIGS. 1 to 10 in combination that the pressure relief valve 5 is integrated in the valve body 3 of the check valve 1. To this end, the valve body 3 of the check valve 1 is penetrated by a centrally disposed pressure relief duct 12, in which pressure relief duct 12 the closing member 6 is disposed so as to be movable between the closed position and the open position of the pressure relief valve 5.

The second valve seat 7, which is assigned to the closing member 6 of the pressure relief valve 5, is formed by an annular face which preferably widens conically counter to the flow direction Pf1. Since the closing member 6 at least in the circumferential sub-region thereof that in the closed position bears on the second valve seat 7 and carries the film or layer 9 has a shape in the form of a ball segment or spherical segment, the closing member 6 in the closed position of the pressure relief valve 5 bears on the annular face of the second valve seat 7 only in a linearly encircling region.

The closing member 6 here has an elongate shape. The closing member 6 here, on the inflow side thereof as well as on the outflow side thereof, carries in each case one stopper 13, 14. While the stopper 13 that is disposed on the inflow side on the closing member 6 and is oriented in the flow direction Pf1 has a cylindrical stopper shape, the stopper 14 that is disposed on the outflow side on the closing member 6 and is oriented counter to the flow direction Pf1 is configured so as to be frustoconical and tapers toward the free stopper end thereof.

In order for the closing member core 8 that carries the elastic layer 9 not to plunge into the available opening cross section of the valve seat 7 and be jammed therein, the closing member core 8 has a diameter which is larger in comparison to the smallest diameter of the valve seat 7.

The closing member core 8 can be produced from a comparatively hard thermoplastic plastics material, for example from POM or PBT, or from any other suitable material. In contrast, the elastic film or layer 9 is preferably composed of silicone. The film or layer 9 here can have a layer thickness of 0.10 to 0.50 mm, preferably of 0.15 to 0.40 mm, and in particular of 0.17 to 0.32 mm. It is advantageous for this film or layer 9 to have a Shore hardness of 30 to 100 Sh-A, preferably of 70 to 90 Sh-A.

The valve seat 7 of the pressure relief valve 5 is preferably produced from a hard material and in particular from a hard thermoplastic plastics material. When comparing in particular FIGS. 8 and 10 it becomes obvious that the pressure relief valve 5 in the open position thereof shown in FIG. 10 opens only so far that the check valve 1 loses tightness in the region of the valve seat 7 of the pressure relief valve 5 of said check valve 1. In the process, the closing member 6 of the pressure relief valve 5 is only slightly raised from the valve seat 7 so as to release the water path for a minor sub-quantity of water prevalent at a positive pressure on the outflow side and so as to correspondingly dissipate the positive pressure.

Figures 7, 8:
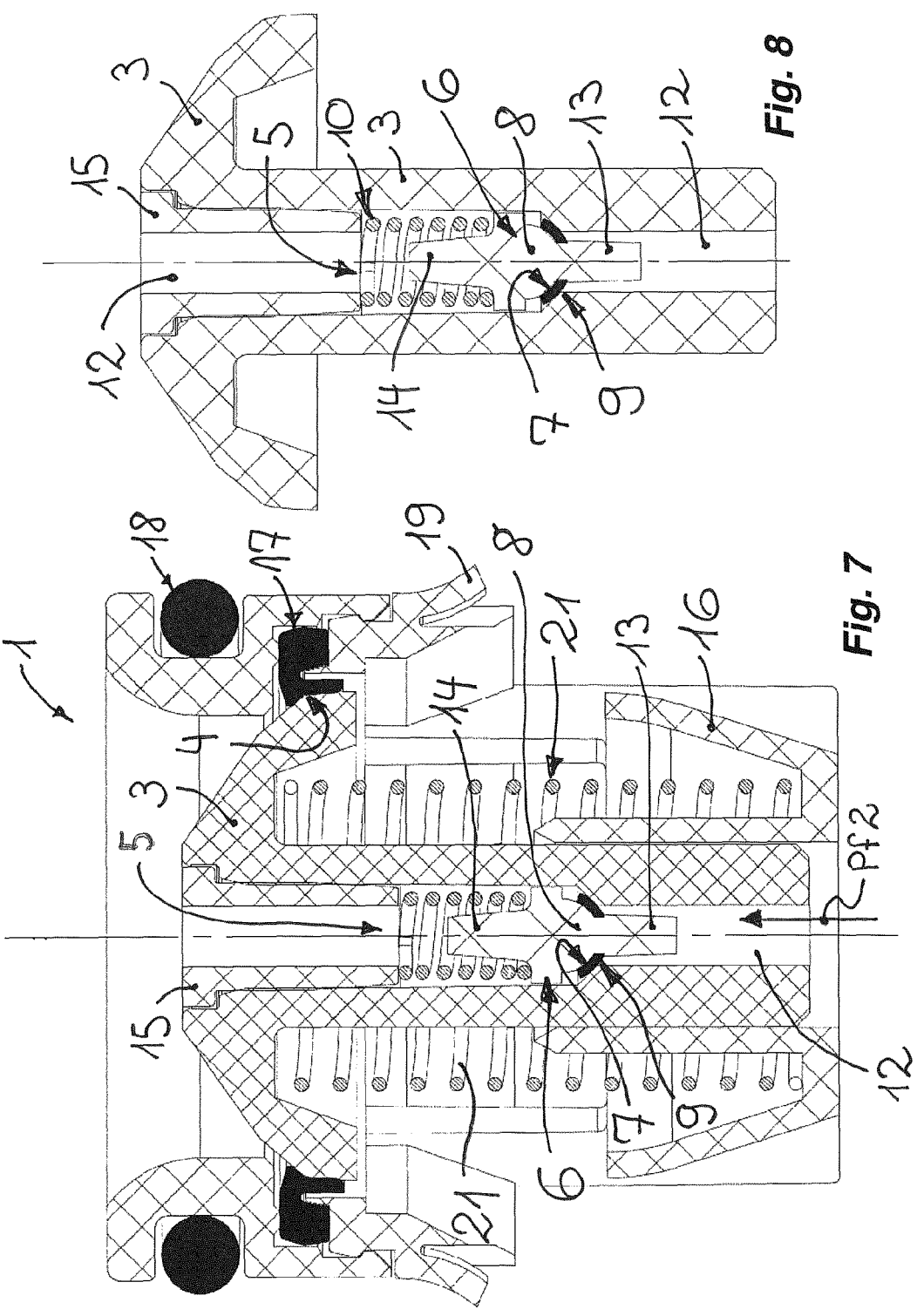
FIG. 7 shows the check valve from FIGS. 1 to 3 and 5, which is illustrated in an enlarged longitudinal section here, in the closed position of the pressure relief valve thereof.
FIG. 8 shows the valve body of the check valve shown in FIGS. 1 to 3, 5 and 7, having the pressure relief valve situated in the closed position thereof.
Figure 10:
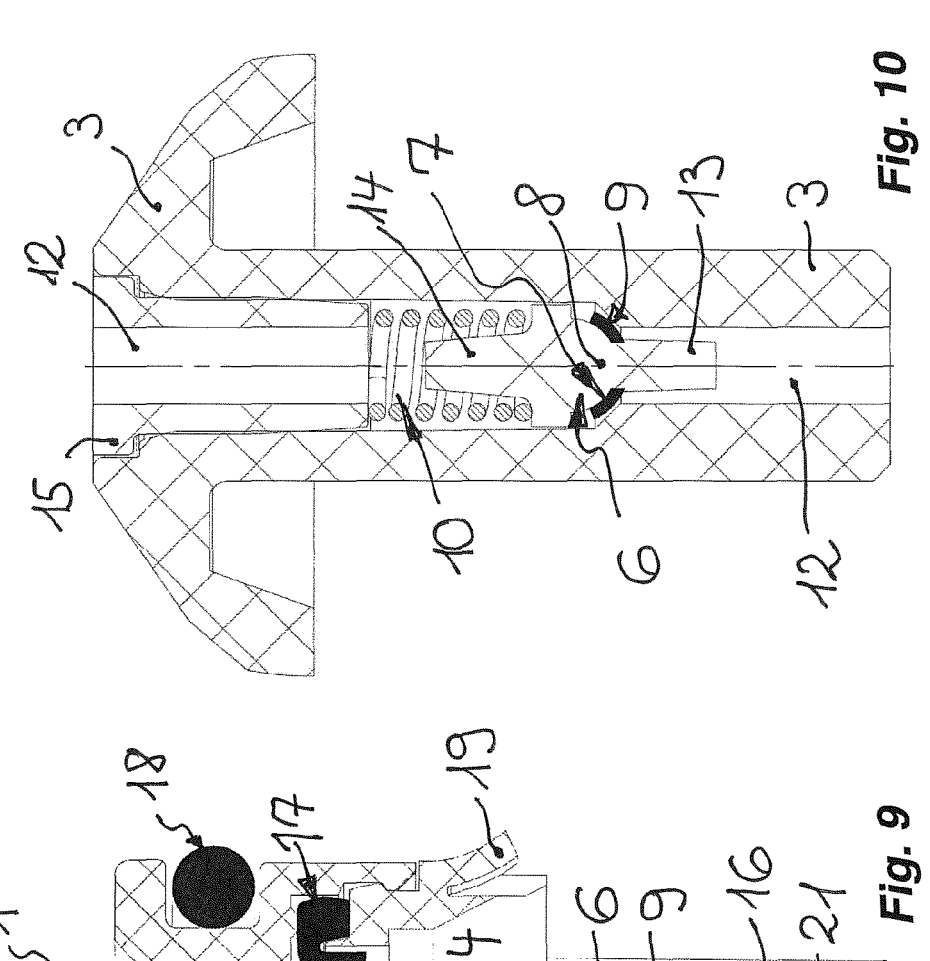
FIG. 10 shows the valve body of the check valve shown in FIGS. 1 to 3, 5, 7 and 9, having the pressure relief valve situated in the open position thereof.
Figure 9:
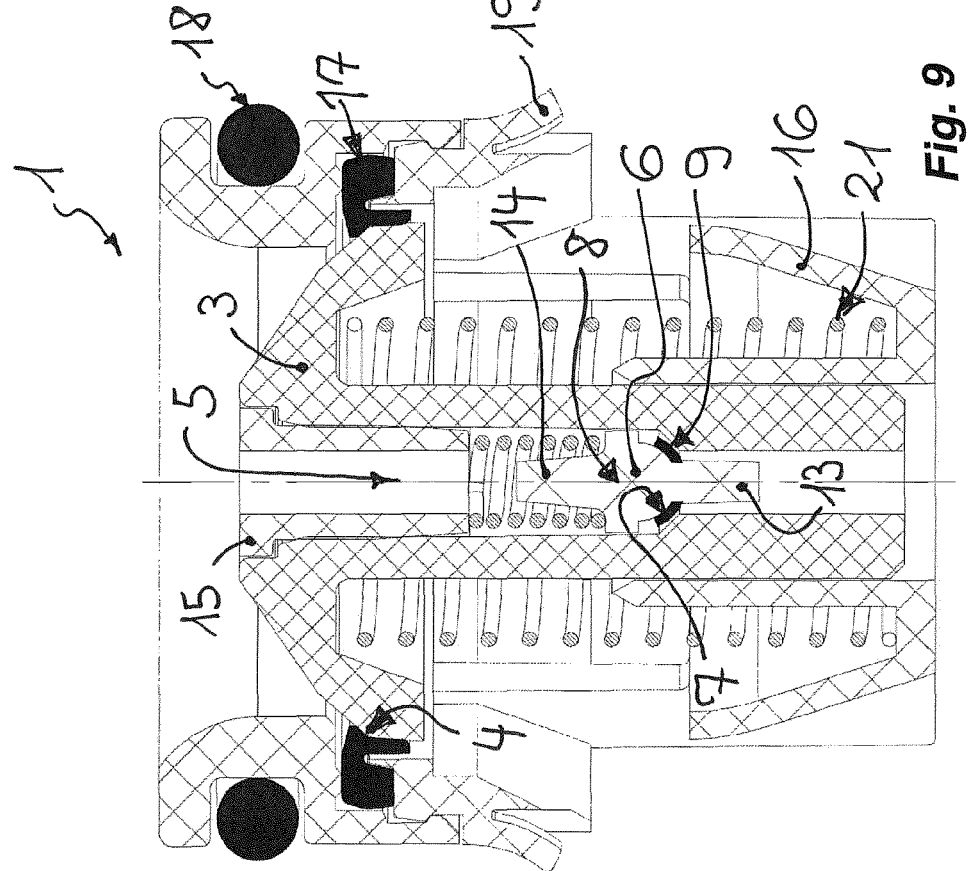
FIG. 9 shows the check valve from FIGS. 1 to 3, 5 and 7, which is likewise in a longitudinal section here, in the open position of the pressure relief valve thereof.

It can be seen in FIGS. 7 and 9 that when assembling the check valve 1 shown here, the closing member 6 by way of the stopper 13 thereof oriented in the flow direction Pf1 of the check valve is first pushed into the pressure relief duct 12. Once the compression spring 10, which serves as the restoring force, has been placed on the outflow-side stopper 14, which is oriented counter to the flow direction Pf1 of the check valve, the pressure relief duct 12 is constricted by a sleeve-shaped plug 15, said plug 15 between itself and the closing member 6 of the pressure relief valve 5 clamping the compression spring 10.

The check valve 1 has a valve housing 11 which on the outflow side thereof has a spring receptacle 16 in the shape of a pocket. The compression spring 21, which serves as the restoring force, is inserted into this spring receptacle 16 in such a manner that this compression spring 21 is clamped between the spring receptacle 16 and the outflow side of the valve body 3. The valve body 3 here is configured approximately in the shape of a mushroom. Provided on the valve seat 4 of the check valve 1 is an annular seal 17, the valve body 3 in the closed position of the check valve 1 bearing tightly on said annular seal 17. A sealing ring 18 which seals the annular gap between the external circumference of the valve housing 11 and the internal circumference of the supply line 2, which therein receives the valve housing 11 of the check valve 1, is provided on the external circumference of the valve housing 11. Latching arms 19 project outward on the circumference of the valve housing 11, said latching arms 19 in the use position of the check valve 1 being supported on an annular shoulder on the internal circumference of the supply line 2. The valve housing 11 here is inserted into an insertion opening 20 of the supply line 2, said insertion opening 20 being configured as a cross-sectional widening of this supply line 2.

LIST OF REFERENCE SIGNS

1 Check valve
2 Supply line
3 Valve body
4 (First) valve seat of the check valve 1
5 Pressure relief valve
6 Closing member
7 (Second) valve seat of the pressure relief valve 5
8 Closing member core
9 Layer
10 Compression spring of the pressure relief valve
11 Valve housing
12 Pressure relief duct
13 Inflow-proximal stopper on the closing member 6, oriented in the flow direction Pf1 of the check valve
14 Outflow-proximal stopper on the closing member 6, oriented counter to the flow direction Pf1 of the check valve
15 Plug
16 Spring receptacle
17 Annular seal

18 Sealing ring
19 Latching arms
20 Insertion opening
21 Compression spring of the check valve
Pf1 Flow direction of the check valve 1
Pf2 Flow direction of the pressure relief valve 5

The invention claimed is:

1. A check valve (1), comprising:
a valve body (3) which by incoming water in a flow direction (Pf1) is movable counter to a restoring force, from a closed position in which the valve body (3) bears on a first valve seat (4), to an open position in which the valve body (3) is raised from the first valve seat (4);
a pressure relief valve (5) which has a closing member (6) which by a pressure of the water returning counter to the flow direction (Pf1) is movable counter to a restoring force, from a closed position in which the closing member (6) bears tightly on a second valve seat (7), to an open position in which the closing member (6) is raised from the second valve seat (7);
wherein the restoring force acting on the closing member (6) of the pressure relief valve (5) is greater in comparison to the restoring force acting on the valve body (3); and wherein
the closing member (6) of the pressure relief valve (5) has a closing member core (8) from a first material, said closing member core (8), at least in a sub-region of the closing member core (8) that in the closed position bears on the second valve seat (7), carries a film or a layer (9) from a second, at least one of comparatively softer material than the closing member core or an elastic material, and the film or layer (9) has a thickness that is 0.50 mm or less and extends with the thickness on the closing member (6) in an extent direction of the second valve seat (7) in the flow direction,
wherein a first circumferential sub-region of the closing member core (8) on an inflow side of the of the closing member core (8) that contacts the second valve seat (7) in the closed position is a ball segment or a spherical segment,
wherein a second circumferential sub-region of the closing member core (8) on an outflow side of the closing member core (8) is a cylindrical segment,
wherein the closing member (6) is a bi-component or multi-component injection-molded plastic part comprising the closing member core (8), an inflow-side stopper (13), and an outflow-side stopper (14),
wherein the inflow-side stopper (13) has a cylindrical stopper shape and is disposed on the inflow side on the closing member (6) and is oriented in the flow direction (Pf1), and
wherein the outflow-side stopper (14) is disposed on an outflow side of the closing member (6) and is oriented counter to the flow direction (Pf1).

2. The check valve as claimed in claim 1, wherein at least one of the restoring force acting on the valve body (3) or the restoring force acting on the closing member (6) is applied by at least one rubber-elastic or spring-elastic restoring element (21; 10).

3. The check valve as claimed in claim 2, wherein the at least one restoring element (21; 10) comprises a compression spring.

4. The check valve as claimed in claim 1, further comprising a valve housing (11).

5. The check valve as claimed in claim 1, wherein the pressure relief valve (5) is integrated in the valve body (3).

6. The check valve as claimed in claim 1, wherein the valve body (3) is penetrated by a pressure relief duct (12), and the closing member (6) is disposed in the pressure relief duct so as to be movable between the closed position and the open position of the pressure relief valve (5).

7. The check valve as claimed in claim 1, wherein the second valve seat (7) is formed by an annular face which widens conically counter to the flow direction (Pf1).

8. The check valve as claimed in claim 1, wherein the film or layer (9) is disposed on at least the first circumferential sub-region of the closing member (6) that is as the ball segment or the spherical segment.

9. The check valve as claimed in claim 1, wherein the outflow-side stopper (14) tapers toward a free stopper end thereof.

10. The check valve as claimed in claim 1, wherein the closing member core (8) has a diameter which is larger in comparison to a smallest diameter of the second valve seat (7).

11. The check valve as claimed in claim 1, wherein the closing member core (8) comprises a thermoplastic material.

12. The check valve as claimed in claim 1, wherein the film or layer (9) is comprised of silicone.

13. The check valve as claimed in claim 1, wherein the film or layer (8) has a layer thickness of 0.10 to 0.50 mm.

14. The check valve as claimed in claim 1, wherein the film or layer (9) has a Shore hardness of 30 to 100 Sh-A.

15. The check valve as claimed in claim 1, wherein the check valve (1) in a region of the second valve seat (7) is produced from a hard material relative to the second material of the film or layer.

16. The check valve as claimed in claim 1, wherein the film or layer (9) is produced from an elastomer.

\* \* \* \* \*